(12) United States Patent
Jiang et al.

(10) Patent No.: US 12,542,296 B2
(45) Date of Patent: Feb. 3, 2026

(54) SYSTEM AND METHOD FOR A FUEL CELL SUBGASKET ACTIVE AREA EDGE WITH THROUGH-PLANE PHOTON CONDUCTION

(71) Applicant: GM GLOBAL TECHNOLOGY OPERATIONS LLC, Detroit, MI (US)

(72) Inventors: Ruichun Jiang, Troy, MI (US); Wenbin Gu, Sterling Heights, MI (US); Matthew J. Beutel, Webster, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 695 days.

(21) Appl. No.: 18/076,829

(22) Filed: Dec. 7, 2022

(65) Prior Publication Data

US 2024/0194923 A1  Jun. 13, 2024

(51) Int. Cl.
| | | |
|---|---|---|
| *H01M 8/242* | (2016.01) | |
| *H01M 8/10* | (2016.01) | |
| *H01M 8/1004* | (2016.01) | |
| *H01M 8/1044* | (2016.01) | |

(52) U.S. Cl.
CPC ......... *H01M 8/242* (2013.01); *H01M 8/1004* (2013.01); *H01M 8/1044* (2013.01); *H01M 2008/1095* (2013.01); *H01M 2250/20* (2013.01)

(58) Field of Classification Search
CPC .. H01M 8/242; H01M 8/1004; H01M 8/1044; H01M 2008/1095; H01M 2250/20; H01M 8/0273; H01M 8/0276; H01M 8/0284; Y02E 60/50
See application file for complete search history.

*Primary Examiner* — Helen Oi K Conley
(74) *Attorney, Agent, or Firm* — Quinn IP Law

(57) ABSTRACT

A system for a fuel-cell subgasket active area edge with through-plane proton conduction is provided. The system includes a fuel-cell membrane-subgasket assembly. The assembly includes an active area including a proton exchange membrane and a first portion of a transitional proton-conductive material attached to the proton exchange membrane. The assembly further includes a non-active subgasket boundary surrounding the active area, configured for preventing a flow of gaseous material and liquid material therethrough. The non-active subgasket boundary includes a non-conductive subgasket and a second portion of the transitional proton-conductive material attached to the subgasket.

20 Claims, 6 Drawing Sheets

SYSTEM AND METHOD FOR A FUEL CELL SUBGASKET ACTIVE AREA EDGE WITH THROUGH-PLANE PHOTON CONDUCTION

INTRODUCTION

The disclosure generally relates to a system and method for a fuel-cell subgasket active area edge with through-plane proton conduction.

A fuel-cell utilizes a flow of hydrogen gas or another fuel and a flow of oxygen to create electrical energy. A fuel-cell includes at least one pair of anode electrode and cathode electrode separated by a proton exchange membrane (PEM). As hydrogen or another fuel is exposed to the anode electrode and as oxygen in the form of compressed air is exposed to the cathode electrode, a chemical reaction takes place. The PEM facilitates ion exchange between the anode electrode and cathode electrode useful for the chemical reaction.

SUMMARY

A system for a fuel-cell subgasket active area edge with through-plane proton conduction is provided. The system includes a fuel-cell membrane-subgasket assembly. The fuel-cell membrane-subgasket assembly includes an active area. The active area includes a proton exchange membrane and a first portion of a transitional proton-conductive material attached to the proton exchange membrane. The fuel-cell membrane-subgasket assembly further includes a non-active subgasket boundary surrounding the active area, configured for preventing a flow of gaseous material and liquid material therethrough. The non-active subgasket boundary includes a non-conductive subgasket and a second portion of the transitional proton-conductive material attached to the subgasket.

In some embodiments, the non-conductive subgasket is a first non-conductive subgasket. The non-active subgasket boundary further includes a second non-conductive subgasket.

In some embodiments, a first side of the second portion of the transitional proton-conductive material is attached to the first non-conductive subgasket with an adhesive. A second side of the second portion of the transitional proton-conductive material is attached to the second non-conductive subgasket with the adhesive.

In some embodiments, the non-conductive subgasket is a first non-conductive subgasket. The non-active subgasket boundary further includes a second non-conductive subgasket. A first side of the second portion of the transitional proton-conductive material is attached to the first non-conductive subgasket with an adhesive. The second non-conductive subgasket is attached to the first non-conductive subgasket with the adhesive.

In some embodiments, the non-conductive subgasket is a first non-conductive subgasket. The non-active subgasket boundary further includes a second non-conductive subgasket. The transitional proton-conductive material is formed in one piece with the second non-conductive subgasket. A first side of the second portion of the transitional proton-conductive material and the second non-conductive subgasket are attached to the first non-conductive subgasket with an adhesive.

In some embodiments, the transitional proton-conductive material is constructed with a polyimide film. The transitional proton-conductive material includes micro holes filled with proton conductive ionomer.

In some embodiments, the transitional proton-conductive material is constructed with at least one of polyethylene naphthalate, polyphenylsulfone, polyvinylidene fluoride, polyphenylene sulfide, polyether ether ketone, or expanded polytetrafluoroethylene. The transitional proton-conductive material includes micro holes filled with proton conductive ionomer.

In some embodiments, the proton exchange membrane is attached to a first side of the transitional proton-conductive material. The fuel-cell membrane-subgasket assembly further includes a cathode electrode attached to the proton exchange membrane. The fuel-cell membrane-subgasket assembly further includes an anode electrode attached to a second side of the transitional proton-conductive material.

In some embodiments, the fuel-cell membrane-subgasket assembly further includes a cathode electrode attached to a first side of the transitional proton-conductive material. The proton exchange membrane is attached to a second side of the transitional proton-conductive material. The fuel-cell membrane-subgasket assembly further includes an anode electrode attached to the proton exchange membrane.

According to one alternative embodiment, a device including a system for a fuel-cell subgasket active area edge with through-plane proton conduction is provided. The device includes the system including a fuel-cell membrane-subgasket assembly. The fuel-cell membrane-subgasket assembly includes an active area. The active area includes a proton exchange membrane and a first portion of a transitional proton-conductive material attached to the proton exchange membrane. The fuel-cell membrane-subgasket assembly further includes a non-active subgasket boundary surrounding the active area and configured for preventing a flow of gaseous material and liquid material therethrough. The non-active subgasket boundary includes a non-conductive subgasket and a second portion of the transitional proton-conductive material attached to the non-conductive subgasket.

In some embodiments, the device is a vehicle.

In some embodiments, the non-conductive subgasket is a first non-conductive subgasket. The non-active subgasket boundary further includes a second non-conductive subgasket. A first side of the second portion of the transitional proton-conductive material is attached to the first non-conductive subgasket with an adhesive. A second side of the second portion of the transitional proton-conductive material is attached to the second non-conductive subgasket with the adhesive.

In some embodiments, the non-conductive subgasket is a first non-conductive subgasket. The non-active subgasket boundary further includes a second non-conductive subgasket. A first side of the second portion of the transitional proton-conductive material is attached to the first non-conductive subgasket with an adhesive. The second non-conductive subgasket is attached to the first non-conductive subgasket with the adhesive.

In some embodiments, the non-conductive subgasket is a first non-conductive subgasket. The non-active subgasket boundary further includes a second non-conductive subgasket. The transitional proton-conductive material is formed in one piece with the second non-conductive subgasket. A first side of the second portion of the transitional proton-conductive material and the second non-conductive subgasket are attached to the first non-conductive subgasket with an adhesive.

In some embodiments, the transitional proton-conductive material is constructed with a polyimide film. The transitional proton-conductive material includes micro holes filled with proton conductive ionomer.

In some embodiments, the transitional proton-conductive material is constructed with at least one of polyethylene naphthalate, polyphenylsulfone, polyvinylidene fluoride, polyphenylene sulfide, polyether ether ketone, or expanded polytetrafluoroethylene. The transitional proton-conductive material includes micro holes filled with proton conductive ionomer.

In some embodiments, the proton exchange membrane is attached to a first side of the transitional proton-conductive material. The fuel-cell membrane-subgasket assembly further includes a cathode electrode attached to the proton exchange membrane. The fuel-cell membrane-subgasket assembly further includes an anode electrode attached to a second side of the transitional proton-conductive material.

In some embodiments, the fuel-cell membrane-subgasket assembly further includes a cathode electrode attached to a first side of the transitional proton-conductive material. The proton exchange membrane is attached to a second side of the transitional proton-conductive material. The fuel-cell membrane-subgasket assembly further includes an anode electrode attached to the proton exchange membrane.

According to one alternative embodiment, a method to create a fuel-cell subgasket active area edge with through-plane proton conduction is provided. The method includes attaching a first portion of a transitional proton-conductive material to an inner perimeter of a first picture frame-shaped subgasket and an inner perimeter of a second picture frame-shaped subgasket. The method further includes attaching a second portion of the transitional proton-conductive material to an outer perimeter of a proton exchange membrane and an outer perimeter of a first electrode layer. The proton exchange membrane is connected to a second electrode layer. The first picture frame-shaped subgasket, the second picture frame-shaped subgasket, the transitional proton-conductive material, the proton exchange membrane, the first electrode, and the second electrode together define a fuel-cell membrane-subgasket assembly.

In some embodiments, the fuel-cell membrane-subgasket assembly is a first fuel-cell membrane-subgasket assembly. The method further includes assembling the first fuel-cell membrane-subgasket assembly to a second fuel-cell membrane-subgasket assembly to form a fuel-cell stack and utilizing the fuel-cell stack to provide a useful flow of electrical energy.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 8 illustrates the transitional proton-conductive material, wherein the polymer support film is exposed on a first side and a second side;

FIG. 9 illustrates the transitional proton-conductive material, wherein a first proton conductive ionomer overflow layer covers a first side of the polymer support film and a second proton conductive ionomer overflow layer covers a second side of the polymer support film; and FIG. 10 illustrates the transitional proton-conductive material, wherein a first proton conductive ionomer overflow layer covers a first side of the polymer support film and the polymer support film is exposed on a second side.

DETAILED DESCRIPTION

Figure 1:
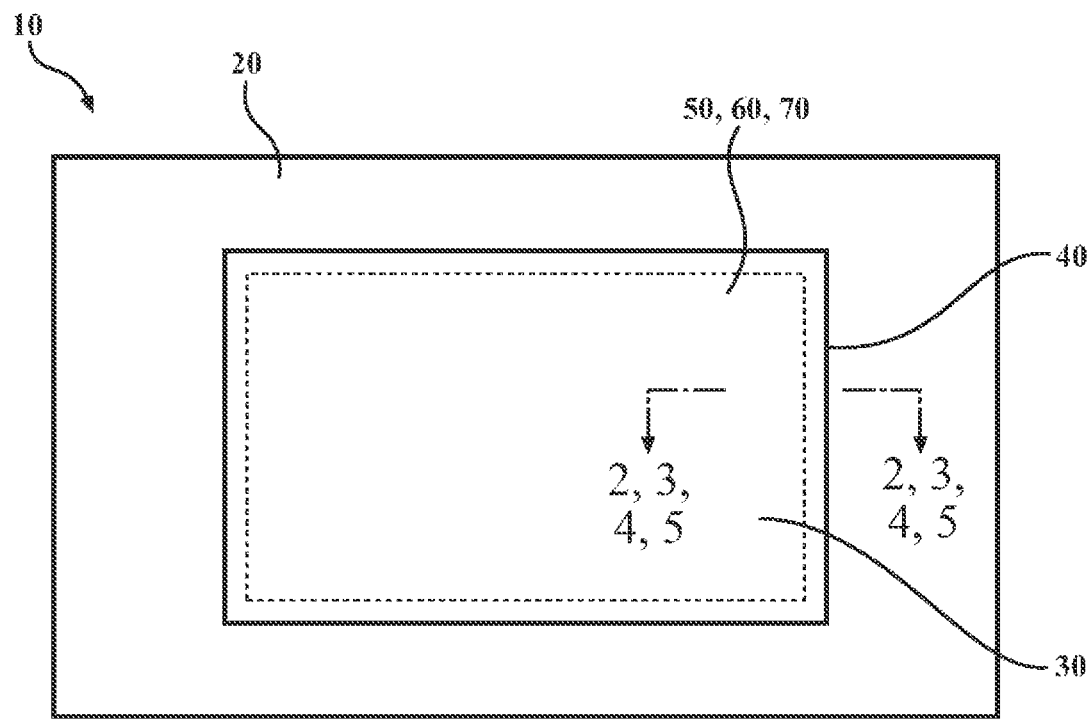
FIG. 1 schematically illustrates in a front view a fuel-cell membrane-subgasket assembly, wherein a cross-sectional view is defined for FIGS. 2-5, in accordance with the present disclosure.

A fuel-cell may include a first end plate, a first fuel-cell membrane-subgasket assembly, a bi-polar plate, a second fuel-cell membrane-subgasket assembly, and a second end plate. The bi-polar plate may be constructed with metal or graphite. The end plates and the bi-polar plate may include flow channels to direct a fuel, an oxidant, and a coolant to and/or through the fuel-cell to facilitate the electrochemical reaction of the fuel-cell and to cool the fuel-cell, respectively. Headers upon a subgasket of the fuel-cell membrane-subgasket assembly may aid in channeling the fuel, the oxidant, and the coolant through the fuel-cell. A plurality of bi-polar plates may be utilized to separate and enable use of more than two fuel-cell membrane-subgasket assemblies in the fuel-cell. The two end plates are used to cover and abut the two outer-most fuel-cell membrane-subgasket assemblies in the fuel-cell.

The fuel-cell membrane-subgasket assembly may include an active area, through which protons may pass to facilitate the electrical energy-generating electrochemical reaction of the fuel-cell. The active area may be described as a planar region upon the fuel-cell membrane-subgasket assembly. The active area enables through-plane proton conduction, meaning that protons are conducted from one side of the planar region to a second side of the planar region through the active area. The active area may include a proton exchange membrane (PEM). In one embodiment, the PEM may be a rectangle shape. The fuel-cell membrane-subgasket assembly may further include a non-active subgasket boundary surrounding the active area. The non-active subgasket boundary is configured for holding the PEM in a desired location within the fuel-cell stack and further for preventing a flow of gaseous and liquid material therethrough. The non-active subgasket boundary may include one or more non-conductive subgaskets configured for preventing the flow of gaseous and liquid material therethrough. The active area may further include a subgasket overlap region, wherein a portion of the subgasket overlaps a portion of the PEM to enable the subgasket to be adhered to the PEM.

The subgasket(s) hold the PEM in a desired position within the fuel-cell stack. The subgasket and the PEM are constructed with different materials. The subgasket and the PEM are planar and are each constructed with thin materials which are impractical to attach thin end to thin end. In some embodiments, the PEM and the subgasket overlap in a PEM/subgasket overlap area (PEM/SG overlap area). The PEM and subgasket in the PEM overlap area may be attached or adhered to each other with a layer of adhesive.

The PEM/SG overlap area is effective in joining the material of the PEM with the material of the subgasket. Although the PEM is present in the PEM/SG overlap area, the PEM/SG overlap area is not a part of the active area because the layer of the subgasket in the PEM/SG overlap area is not proton conductive and prevents proton exchange therethrough. The non-conductive properties of the PEM/SG overlap area may cause in-plane membrane current flow, with current flowing perpendicular to the thickness of the PEM to flow around the non-conductive, overlapping subgasket material. Cerium may be present in the PEM as a scavenger material improving the durability of the PEM. In-plane membrane current flow in the subgasket edge region during fuel-cell operation may cause undesired cerium migration within the PEM and accumulation of the cerium in the edge region. This may cause PEM chemical degradation due to cerium depletion at the active area.

Additionally, by creating non-conductive properties in the PEM/SG overlap area, a total surface area of the active area is reduced as compared to a total surface area of the PEM, thereby reducing an overall efficiency and effectiveness of the fuel-cell stack.

A system and method for a fuel-cell subgasket active area edge with through-plane proton conductive design is provided. A transitional proton-conductive material is utilized in a proton exchange membrane overlap area (PEM overlap area) to enable proton flow through the PEM overlap area and reduce in-plane membrane current flow. The PEM may be adhered or attached to a first portion of the transitional proton-conductive material in the active area, and the subgasket may be adhered to or attached to a second portion or a remaining portion of the transitional proton-conductive material outside of the active area.

The disclosed system includes an active area edge configured for reducing in-plane current flow, thus mitigating cerium migration and edge accumulation. Reducing in-plane current flow improves fuel-cell chemical durability. The disclosed system enables an entire surface area of the PEM to operate as an active area. The transitional proton-conductive material may be selected to be in-plane hygrothermal stable, meaning that the material does not significantly mechanically deform, swell, or change dimensions through varying operating conditions.

The transitional proton-conductive material may be constructed with various materials. In one embodiment, the transitional proton-conductive material may include a polymer support film including a porous structure, wherein pore-shaped features or micro holes of the porous structure may be filled with a proton conductive ionomer to provide through-plane proton conductivity. The polymer support film may be constructed with one of a number of candidate polymers, including but not limited to polyimide (PI), polyethylene naphthalate (PEN), polyphenylsulfone (PPSU), polyvinylidene fluoride (PVDF), polyphenylene sulfide (PPS), or polyether ether ketone (PEEK). In another example, the transitional proton-conductive material may be constructed with expanded polytetrafluoroethylene (expanded PTFE or ePTFE) including a porous structure with micro holes which may be filed with a proton conductive ionomer. In one embodiment, the transitional proton-conductive material may be described as a polyimide support film with through holes filled by proton conductive ionomer.

The ionomer material or the proton conductive ionomer may include a perfluorosulfonic acid-type (PFSA-type) with various options of chemical structure possible. Alternatively, the ionomer material or the proton conductive ionomer may include a hydrocarbon-type (HC-type) with various options of chemical structure possible. The proton conductive ionomer materials may have an equivalent weight in a range from 500 equivalent weight (EW) to 1100 EW.

The polymer support film may be created with pore-shaped features or through micro holes by various processes. In one exemplar, a nickel micromold or micro drilling may be utilized. The pore-shaped features or micro holes disclosed herein may have inner diameters or openings in a size range from 1 micrometer to 100 micrometers. An area density of the pore-shaped features as compared to a total area of the polymer support film may be in a range from 50% to 90%. Expanded PTFE are commercially available in various types. When expanded PTFE is filled with proton conductive ionomer, the expanded PTFE matrix may have a volume filled with proton conductive ionomer as compared to a total volume of the polymer support film in a range from 30% to 90%.

Referring now to the drawings, wherein like reference numbers refer to like features throughout the several views, FIG. 1 schematically illustrates in a front view a fuel-cell membrane-subgasket assembly 10. FIG. 1 defines a cross-sectional view for FIGS. 2-5, illustrating structures present in a PEM overlap area 40. The fuel-cell membrane-subgasket assembly 10 is illustrated including an active area 30 and a non-conductive subgasket boundary 20 surrounding the active area 30. The active area 30 may include a rectangle-shaped proton exchange membrane 70. The active area 30 may be coincident with and may be defined by a surface area of the proton exchange membrane 70. The non-conductive subgasket boundary 20 may include one or more subgaskets constructed with a non-conductive material preventing gaseous and liquid flow therethrough. The subgaskets of the non-conductive subgasket boundary 20 may be constructed with polyethylene naphthalate (PEN). The PEM overlap area 40 is illustrated including an outer boundary of the active area 30. In the PEM overlap area 40, the proton exchange membrane 70 may be attached to a transitional proton-conductive material that enables protons and current to flow through the PEM overlap area 40. The transitional proton-conductive material may additionally be attached to subgasket materials in the non-conductive subgasket boundary 20.

Figure 2:
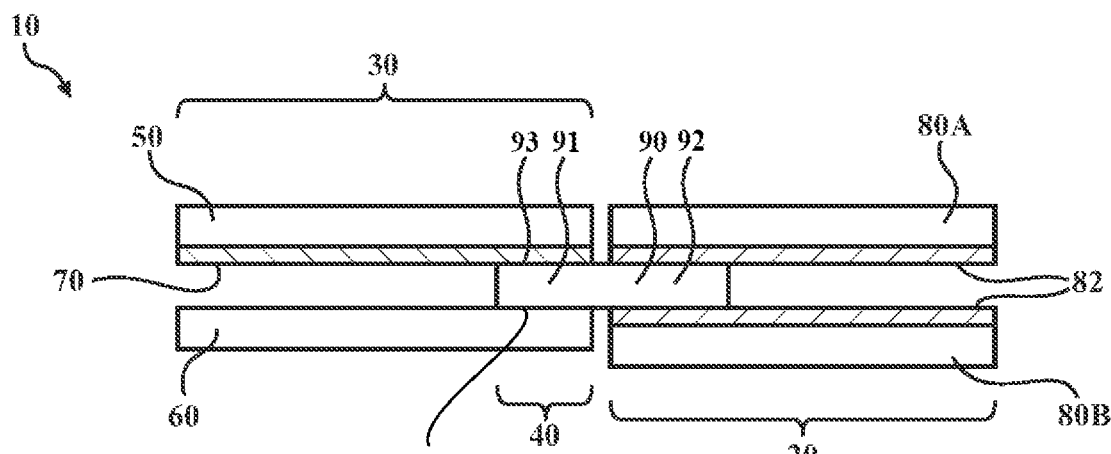
FIG. 2 schematically illustrates in a top-down sectional view a first embodiment of the fuel-cell membrane-subgasket assembly of FIG. 1, in accordance with the present disclosure.

FIG. 2 schematically illustrates in a top-down sectional view a first embodiment of the fuel-cell membrane-subgasket assembly 10 of FIG. 1 in an area of the PEM overlap area 40. The fuel-cell membrane-subgasket assembly 10 is illustrated in cross-section, with substantially similar thicknesses of the various illustrated structures being provided for purposes of illustration. Actual thicknesses of the illustrated structures may vary. The active area 30 of FIG. 1 is illustrated including the proton exchange membrane 70. The fuel-cell membrane-subgasket assembly 10 is further illustrated including an anode electrode 60 and a cathode electrode 50. In the embodiment of FIG. 2, the proton exchange membrane 70 is attached to a flat face of the cathode electrode 50. The active area 30 is also illustrated including a first portion 91 of a transitional proton-conductive material 90. The illustrated transitional proton-conductive material 90 may be a single piece tape or film formed in a rectangular frame shape to be disposed about and extending past an outer perimeter of the proton exchange membrane 70. In another embodiment, the transitional proton-conductive material 90 may include a plurality of linear strips attached around a perimeter of the proton exchange membrane 70, with the plurality of strips forming a rectangular frame shape disposed about and extending past an outer perimeter of the proton exchange membrane 70. The proton exchange membrane 70 is illustrated attached to a first side 93 of the transitional proton-conductive material 90, and the anode electrode 60 is illustrated attached to a second side 94 of the transitional proton-conductive material 90.

The anode electrode 60 and the cathode electrode 50 may include layers of electrocatalysts such as platinum or a platinum alloy on a carbon support material. The layers may further include a proton conductive ionomer binder and additives utilized in the art. The anode electrode 60 and the cathode electrode 50 may each include a gas diffusion layer (GDL) on a side of the respective electrode facing away from the proton exchange membrane 70. In one embodiment, the electrode layer of the anode electrode 60 or the cathode electrode 50 may be coated onto a GDL microporous layer (MPL) in a configuration which may be described as a gas diffusion electrode (GDE). In one embodiment, an anode GDE and a cathode GDE may each be applied to opposing surfaces of a proton exchange membrane 70 and may collectively be described as a membrane electrode assembly (MEA).

The first portion 91 of the transitional proton-conductive material 90 overlaps the proton exchange membrane 70 in the PEM overlap area 40. Because the transitional proton-conductive material 90 is conductive, the first portion 91 is part of the active area 30. A second portion 92 of the transitional proton-conductive material 90 extends past the proton exchange membrane 70 and overlaps with the non-active subgasket boundary 20. The non-active subgasket boundary 20 includes a first subgasket 80A coated with adhesive 82 and a second subgasket 80B coated with adhesive 82. The second portion 92 of the transitional proton-conductive material 90 is adhered to the first subgasket 80A and the second subgasket 80B. The first subgasket 80A is illustrated attached to the first side 93 of the transitional proton-conductive material 90, and the second subgasket 80B is illustrated attached to the second side 94 of the transitional proton-conductive material 90. The dimensions, widths, thicknesses and other properties of the first portion 91 and the second portion 92 may vary. The first subgasket 80A and the second subgasket 80B prevent electron, gas, and liquid flow therethrough. The first subgasket 80A and the second subgasket 80B additionally provide support to the materials of the active area 30 and other surrounding features.

Figure 3:
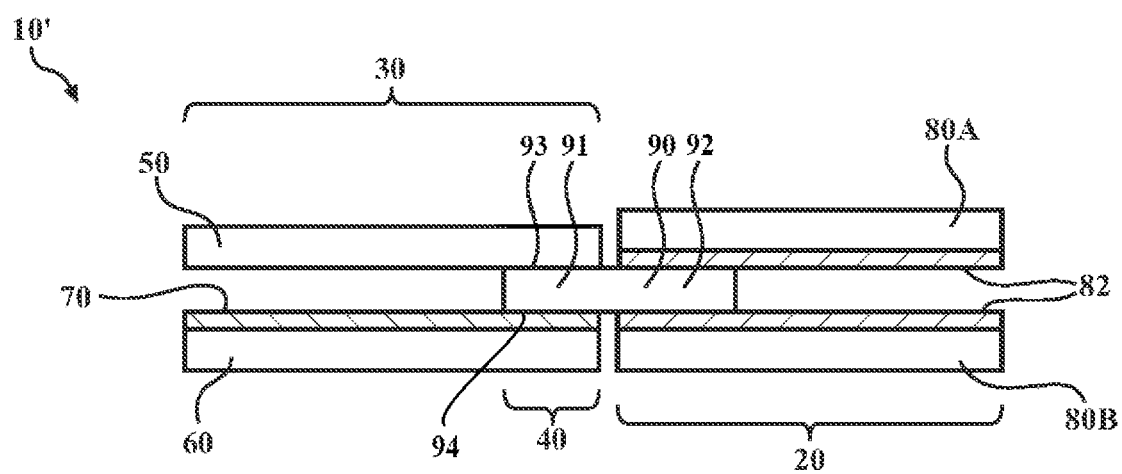
FIG. 3 schematically illustrates in a top-down sectional view a second embodiment of the fuel-cell membrane-subgasket assembly of FIG. 1, in accordance with the present disclosure.

FIG. 3 schematically illustrates in a top-down sectional view a second embodiment 10' of the fuel-cell membrane-subgasket assembly 10 of FIG. 2 in an area of the PEM overlap area 40. The second embodiment 10' is similar to the fuel-cell membrane-subgasket assembly 10 of FIG. 2, with an exception that the proton exchange membrane is attached to a flat face of the anode electrode 60. The second embodiment 10' is illustrated in cross-section, with substantially similar thicknesses of the various illustrated structures being provided for purposes of illustration. Actual thicknesses of the illustrated structures may vary. The active area 30 of FIG. 1 is illustrated including the proton exchange membrane 70. The fuel-cell membrane-subgasket assembly 10 is further illustrated including the anode electrode 60 and the cathode electrode 50. The active area 30 is also illustrated including the first portion 91 of a transitional proton-conductive material 90. The cathode electrode 50 illustrated attached to the first side 93 of the transitional proton-conductive material 90, and proton exchange membrane 70 is illustrated attached to the second side 94 of the transitional proton-conductive material 90.

The first portion 91 of the transitional proton-conductive material 90 overlaps the proton exchange membrane 70 in the PEM overlap area 40. Because the transitional proton-conductive material 90 is conductive, the first portion 91 is part of the active area 30. The second portion 92 of the transitional proton-conductive material 90 extends past the proton exchange membrane 70 and overlaps with the non-active subgasket boundary 20. The non-active subgasket boundary 20 includes the first subgasket 80A coated with adhesive 82 and the second subgasket 80B coated with adhesive 82. The second portion 92 of the transitional proton-conductive material 90 is adhered to the first subgasket 80A and the second subgasket 80B. The first subgasket 80A is illustrated attached to the first side 93 of the transitional proton-conductive material 90, and the second subgasket 80B is illustrated attached to the second side 94 of the transitional proton-conductive material 90.

Figure 4:
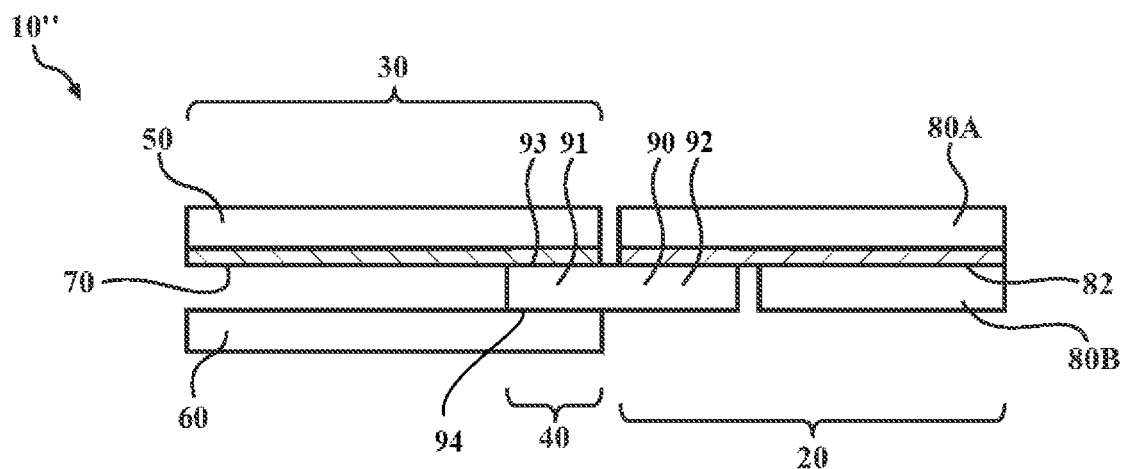
FIG. 4 schematically illustrates in a top-down sectional view a third embodiment of the fuel-cell membrane-subgasket assembly of FIG. 1, in accordance with the present disclosure.

FIG. 4 schematically illustrates in a top-down sectional view a third embodiment 10" of the fuel-cell membrane-subgasket assembly 10 of FIG. 1 in an area of the PEM overlap area 40. The third embodiment 10" is similar to the fuel-cell membrane-subgasket assembly 10 of FIG. 2, with an exception that the second portion 92 of the transitional proton-conductive material 90 is attached to one of the subgaskets 80A, 80B. The third embodiment 10" is illustrated in cross-section, with substantially similar thicknesses of the various illustrated structures being provided for purposes of illustration. Actual thicknesses of the illustrated structures may vary. The active area 30 of FIG. 1 is illustrated including the proton exchange membrane 70. The fuel-cell membrane-subgasket assembly 10 is further illustrated including the anode electrode 60 and the cathode electrode 50. The active area 30 is also illustrated including the first portion 91 of a transitional proton-conductive material 90. The proton exchange membrane 70 is illustrated attached to the first side 93 of the transitional proton-conductive material 90, and the anode electrode 60 is illustrated attached to the second side 94 of the transitional proton-conductive material 90.

The first portion 91 of the transitional proton-conductive material 90 overlaps the proton exchange membrane 70 in the PEM overlap area 40. Because the transitional proton-conductive material 90 is conductive, the first portion 91 is part of the active area 30. The second portion 92 of the transitional proton-conductive material 90 extends past the proton exchange membrane 70 and overlaps with the non-active subgasket boundary 20. The non-active subgasket boundary 20 includes the first subgasket 80A and the second subgasket 80B adhered together with adhesive 82. The adhesive 82 additionally is illustrated adhering the second portion 92 of the transitional proton-conductive material 90 to the first subgasket 80A. The first subgasket 80A is illustrated attached to the first side 93 of the transitional proton-conductive material 90.

Figure 5:
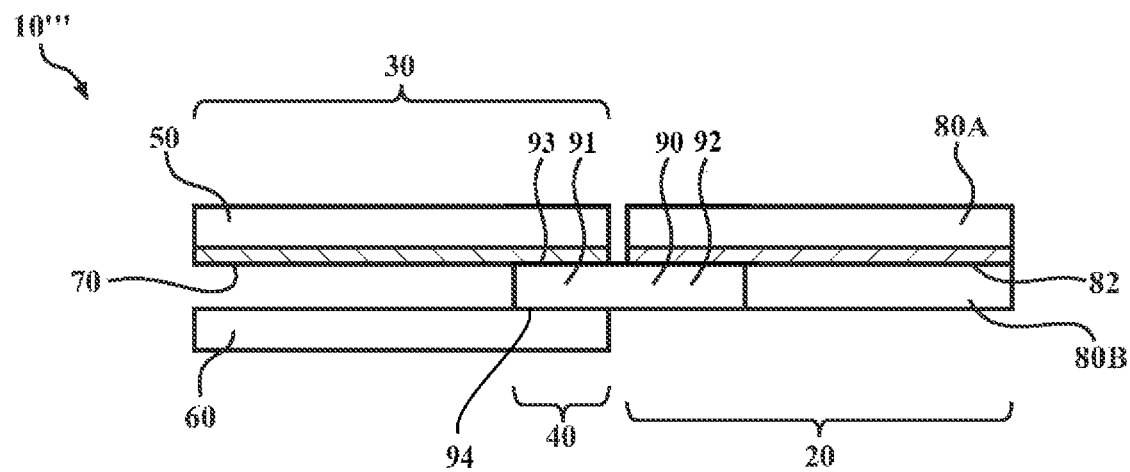
FIG. 5 schematically illustrates in a top-down sectional view a fourth embodiment of the fuel-cell membrane-subgasket assembly of FIG. 1, in accordance with the present disclosure.

FIG. 5 schematically illustrates in a top-down sectional view a fourth embodiment 10''' of the fuel-cell membrane-subgasket assembly 10 of FIG. 1 in an area of the PEM overlap area 40. The fourth embodiment 10''' is similar to the third embodiment 10'' of FIG. 4, with an exception that the transitional proton-conductive material 90 is formed unitarily or in one piece with one of the subgaskets 80A, 80B. The fourth embodiment 10''' is illustrated in cross-section, with substantially similar thicknesses of the various illustrated structures being provided for purposes of illustration. Actual thicknesses of the illustrated structures may vary. The active area 30 of FIG. 1 is illustrated including the proton exchange membrane 70. The fuel-cell membrane-subgasket assembly 10 is further illustrated including the anode electrode 60 and the cathode electrode 50. The active area 30 is also illustrated including the first portion 91 of a transitional proton-conductive material 90. The proton exchange membrane 70 is illustrated attached to the first side 93 of the transitional proton-conductive material 90, and the anode electrode 60 is illustrated attached to the second side 94 of the transitional proton-conductive material 90.

The first portion 91 of the transitional proton-conductive material 90 overlaps the proton exchange membrane 70 in the PEM overlap area 40. Because the transitional proton-conductive material 90 is conductive, the first portion 91 is part of the active area 30. The second portion 92 of the transitional proton-conductive material 90 extends past the proton exchange membrane 70 and overlaps with the non-active subgasket boundary 20. The non-active subgasket boundary 20 includes the first subgasket 80A and the second subgasket 80B adhered together with adhesive 82. The transitional proton-conductive material 90 is illustrated connected to and formed in one piece with the second subgasket 80B. The first subgasket 80A is illustrated attached to the first side 93 of the transitional proton-conductive material 90

Figure 6:
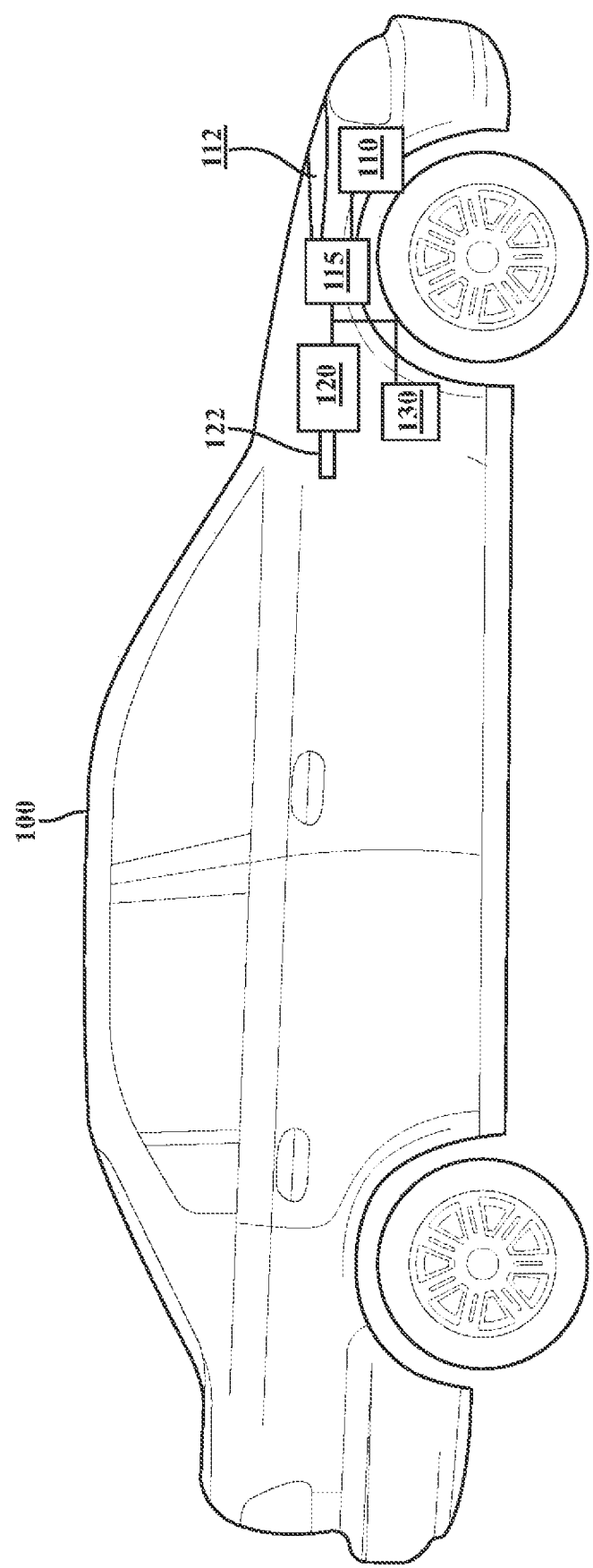
FIG. 6 schematically illustrates a device including an exemplary vehicle including a fuel-cell stack including the fuel-cell membrane-subgasket assembly of FIG. 1, in accordance with the present disclosure.

FIG. 6 schematically illustrates a device 100 depicted as an exemplary vehicle including a fuel-cell stack 115 including the fuel-cell membrane-subgasket assembly 10 of FIG. 1. The device 100 is illustrated including a fuel-cell stack 115. The fuel-cell stack 115 includes one or more fuel-cell membrane-subgasket assemblies 10. The fuel-cell stack 115 may include a repetitious stack of structures useful to provide a plurality of anode electrode and cathode electrode pairs, with each pair being useful to generate electrical energy. The fuel-cell membrane-subgasket assembly 10 is useful to separate and provide proton flow between each of the anode electrodes and a corresponding one of the cathode electrodes. A fuel tank 110 is illustrated, which may include a stored amount of hydrogen gas or other fuel-cell fuel. The fuel tank 110 provides a flow of fuel to the fuel-cell stack 115. An air inlet manifold 112 is illustrated providing a flow of air including oxygen to the fuel-cell stack 115. The fuel-cell stack 115 transforms the flows of fuel and air into electrical energy. The electrical energy may be provided to a battery device 130 and/or a electric machine 120 configured to provide a useful output torque to an output shaft component 122. The device 100 is exemplary and may alternatively include a power generation device, a boat, an airplane, or other similar device.

Figure 7:
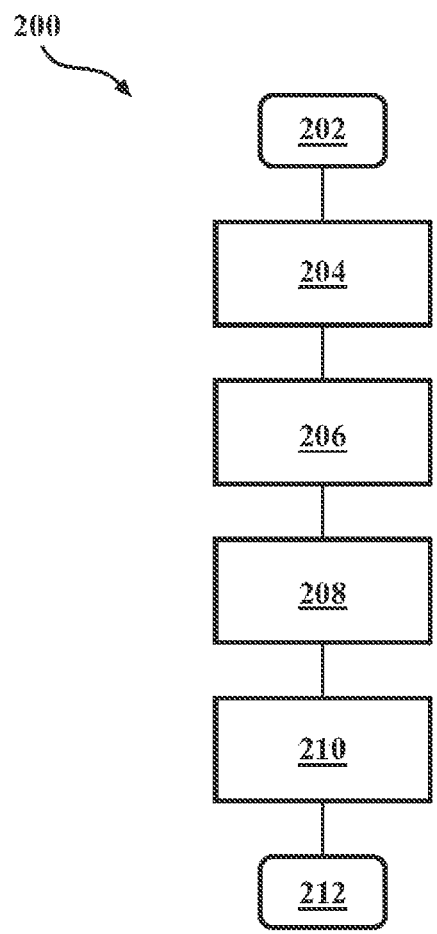
FIG. 7 is a flowchart illustrating a method for creating the fuel-cell membrane-subgasket assembly of FIG. 1, in accordance with the present disclosure.

FIG. 7 is a flowchart illustrating a method 200 for creating the fuel-cell membrane-subgasket assembly 10 of FIG. 1. The method 200 is described in relation to the fuel-cell membrane-subgasket assembly 10 of FIGS. 1 and 2, although the method 200 may alternatively be utilized with other embodiments of the described system, including the second embodiment 10' of FIG. 3, the third embodiment 10'' of FIG. 4, or the fourth embodiment 10''' of FIG. 5. The method 200 starts at a step 202. At a step 204, a first subgasket 80A and a second subgasket 80B are attached to a second portion 92 of a transitional proton-conductive material 90. The transitional proton-conductive material 90 may include a polymer support film such as PI or PEN with a porous structure including through micro holes filled with a proton conductive ionomer. The first subgasket 80A and the second subgasket 80B may be picture frame-shaped, each with an inner perimeter, with the transitional proton-conductive material 90 being attached to the inner perimeters of the first subgasket 80A and the second subgasket 80B. In some embodiments, an adhesive may be utilized to adhere the transitional proton-conductive material 90 to the first subgasket 80A and/or the second subgasket 80B. In another embodiment, the proton conductive ionomer of the proton-conductive material 90 is in direct contact with and adheres to the first subgasket 80A and/or the second subgasket 80B. At a step 206, a first portion 91 of the transitional proton-conductive material 90 is attached to an outer perimeter of a proton exchange membrane 70 and additionally to an outer perimeter of a first electrode of the cathode electrode 50 and the anode electrode 60. The proton exchange membrane 70 is connected to a second electrode of the cathode electrode 50 and the anode electrode 60. In one embodiment, the proton conductive ionomer of the transitional proton-conductive material 90 is in direct contact with and adheres to the proton exchange membrane 70. The connected first subgasket 80A, the second subgasket 80B, the transitional proton-conductive material 90, the proton exchange membrane 70, the cathode electrode 50, and the anode electrode 60 collectively form or define a fuel-cell membrane-subgasket assembly 10. At a step 208, one or more of the fuel-cell membrane-subgasket assemblies 10 are assembled together to form a fuel-cell stack 115 of FIG. 6. At a step 210, the fuel-cell stack 115 is assembled to a device 100 of FIG. 6 to provide useful electrical energy to the device 100. At a step 212, the method 200 ends. The method 200 is exemplary. A number of additional and/or alternative method steps are envisioned, and the disclosure is not intended to be limited to the examples provided herein.

Figure 8:
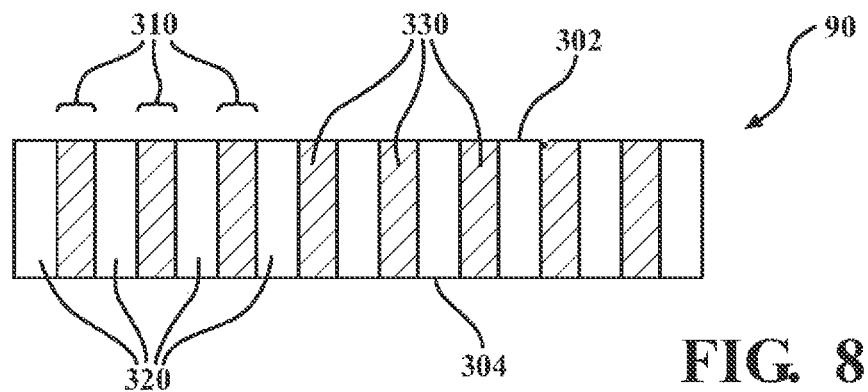
FIGS. 8-10 illustrate exemplary alternative transitional proton-conductive materials in cross-sectional view, in accordance with the present disclosure.
Figure 9:
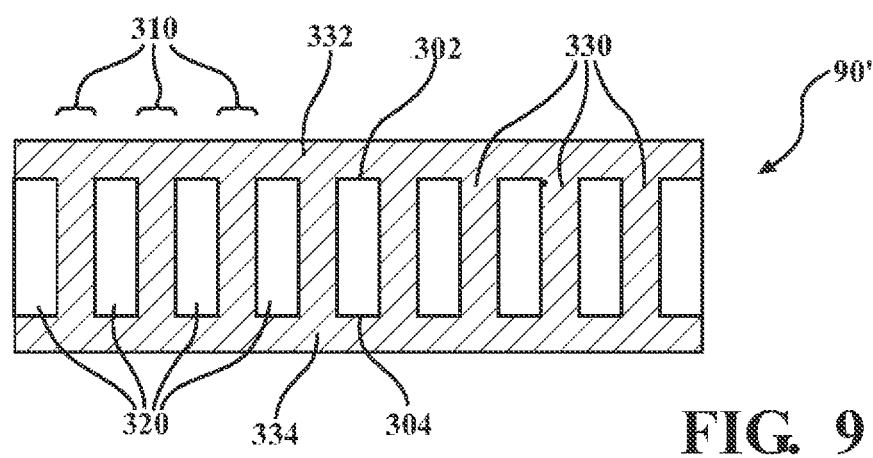
Figure 10:
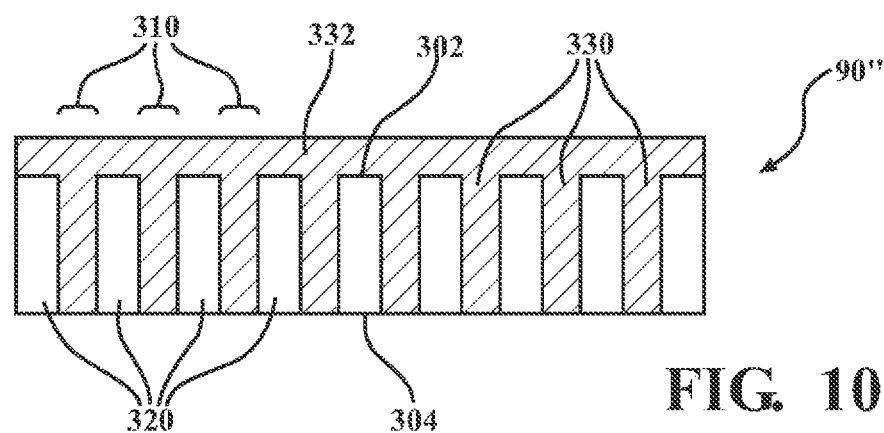

FIGS. 8-10 illustrate exemplary alternative transitional proton-conductive materials 90, 90', 90'' in cross-sectional view. A polymer support film 320 is illustrated including a plurality of pore-shaped features 310, each providing a through-hole in which proton conductive ionomer 330 is filled. By spanning from a first side 302 of the polymer support film 320 to a second side 304 of the polymer support film 320, the proton conductive ionomer 330 may provide a conductive path for protons to flow through the transitional proton-conductive materials 90, 90', 90''. In FIG. 8, the transitional proton-conductive material 90 is illustrated, wherein the polymer support film 320 is exposed on the first side 302 and the second side 304. In FIG. 9, the transitional proton-conductive material 90' is illustrated, a first proton conductive ionomer overflow layer 332 covers the first side 302 of the polymer support film 320, and a second proton conductive ionomer overflow layer 334 covers the second side 304 of the polymer support film 320. In FIG. 10, the transitional proton-conductive material 90'' is illustrated, a first proton conductive ionomer overflow layer 332 covers the first side 302 of the polymer support film 320, and the polymer support film 320 is exposed on the second side 304.

FIGS. 8-10 illustrate the polymer support film 320 each including the plurality of pore-shaped features 310 providing through-holes in which the proton conductive ionomer 330 may be filled. In some embodiments, such as with use of extended PTFE, the polymer support film 320 may include a three-dimensional matrix porous structure that do not include pore-shaped features 310, but rather include complex internal structures which still provide paths through the three-dimensional porous structure. These complex internal structures may be filled with proton conductive ionomer similar to the transitional proton-conductive materials 90, 90', 90" of FIGS. 8-10, respectively.

While the best modes for carrying out the disclosure have been described in detail, those familiar with the art to which this disclosure relates will recognize various alternative designs and embodiments for practicing the disclosure within the scope of the appended claims.

What is claimed is:

1. A system for a fuel-cell subgasket active area edge with through-plane proton conduction, the system comprising:
    a fuel-cell membrane-subgasket assembly, including:
        an active area including:
            a proton exchange membrane;
            a first portion of a transitional proton-conductive material attached to the proton exchange membrane;
        a non-active subgasket boundary surrounding the active area, configured for preventing a flow of gaseous material and liquid material therethrough, and including:
            a non-conductive subgasket; and
            a second portion of the transitional proton-conductive material attached to the subgasket.

2. The system of claim 1, wherein the non-conductive subgasket is a first non-conductive subgasket; and
    wherein the non-active subgasket boundary further includes a second non-conductive subgasket.

3. The system of claim 2, wherein a first side of the second portion of the transitional proton-conductive material is attached to the first non-conductive subgasket with an adhesive; and
    wherein a second side of the second portion of the transitional proton-conductive material is attached to the second non-conductive subgasket with the adhesive.

4. The system of claim 1, wherein the non-conductive subgasket is a first non-conductive subgasket;
    wherein the non-active subgasket boundary further includes a second non-conductive subgasket;
    wherein a first side of the second portion of the transitional proton-conductive material is attached to the first non-conductive subgasket with an adhesive; and
    wherein the second non-conductive subgasket is attached to the first non-conductive subgasket with the adhesive.

5. The system of claim 1, wherein the non-conductive subgasket is a first non-conductive subgasket;
    wherein the non-active subgasket boundary further includes a second non-conductive subgasket;
    the transitional proton-conductive material is formed in one piece with the second non-conductive subgasket; and
    wherein a first side of the second portion of the transitional proton-conductive material and the second non-conductive subgasket are attached to the first non-conductive subgasket with an adhesive.

6. The system of claim 1, wherein the transitional proton-conductive material is constructed with a polyimide film; and
    wherein the transitional proton-conductive material includes micro holes filled with proton conductive ionomer.

7. The system of claim 1, wherein the transitional proton-conductive material is constructed with at least one of polyethylene naphthalate, polyphenylsulfone, polyvinylidene fluoride, polyphenylene sulfide, polyether ether ketone, or expanded polytetrafluoroethylene; and
    wherein the transitional proton-conductive material includes micro holes filled with proton conductive ionomer.

8. The system of claim 1, wherein the proton exchange membrane is attached to a first side of the transitional proton-conductive material;
    wherein the fuel-cell membrane-subgasket assembly further includes a cathode electrode attached to the proton exchange membrane; and
    wherein the fuel-cell membrane-subgasket assembly further includes an anode electrode attached to a second side of the transitional proton-conductive material.

9. The system of claim 1, wherein the fuel-cell membrane-subgasket assembly further includes a cathode electrode attached to a first side of the transitional proton-conductive material;
    wherein the proton exchange membrane is attached to a second side of the transitional proton-conductive material; and
    wherein the fuel-cell membrane-subgasket assembly further includes an anode electrode attached to the proton exchange membrane.

10. A device including a system for a fuel-cell subgasket active area edge with through-plane proton conduction, the device comprising:
    the system including a fuel-cell membrane-subgasket assembly, including:
        an active area including:
            a proton exchange membrane;
            a first portion of a transitional proton-conductive material attached to the proton exchange membrane;
        a non-active subgasket boundary surrounding the active area, configured for preventing a flow of gaseous material and liquid material therethrough, and including:
            a non-conductive subgasket; and
            a second portion of the transitional proton-conductive material attached to the non-conductive subgasket.

11. The device of claim 10, wherein the device is a vehicle.

12. The device of claim 10, wherein the non-conductive subgasket is a first non-conductive subgasket;
    wherein the non-active subgasket boundary further includes a second non-conductive subgasket;
    wherein a first side of the second portion of the transitional proton-conductive material is attached to the first non-conductive subgasket with an adhesive; and
    wherein a second side of the second portion of the transitional proton-conductive material is attached to the second non-conductive subgasket with the adhesive.

13. The device of claim 10, wherein the non-conductive subgasket is a first non-conductive subgasket;
    wherein the non-active subgasket boundary further includes a second non-conductive subgasket;
    wherein a first side of the second portion of the transitional proton-conductive material is attached to the first non-conductive subgasket with an adhesive; and
    wherein the second non-conductive subgasket is attached to the first non-conductive subgasket with the adhesive.

14. The device of claim 10, wherein the non-conductive subgasket is a first non-conductive subgasket;
- wherein the non-active subgasket boundary further includes a second non-conductive subgasket;
- the transitional proton-conductive material is formed in one piece with the second non-conductive subgasket; and
- wherein a first side of the second portion of the transitional proton-conductive material and the second non-conductive subgasket are attached to the first non-conductive subgasket with an adhesive.

15. The device of claim 10, wherein the transitional proton-conductive material is constructed with a polyimide film; and
- wherein the transitional proton-conductive material includes micro holes filled with proton conductive ionomer.

16. The device of claim 10, wherein the transitional proton-conductive material is constructed with at least one of polyethylene naphthalate, polyphenylsulfone, polyvinylidene fluoride, polyphenylene sulfide, polyether ether ketone, or expanded polytetrafluoroethylene; and
- wherein the transitional proton-conductive material includes micro holes filled with proton conductive ionomer.

17. The device of claim 10, wherein the proton exchange membrane is attached to a first side of the transitional proton-conductive material;
- wherein the fuel-cell membrane-subgasket assembly further includes a cathode electrode attached to the proton exchange membrane; and
- wherein the fuel-cell membrane-subgasket assembly further includes an anode electrode attached to a second side of the transitional proton-conductive material.

18. The device of claim 10, wherein the fuel-cell membrane-subgasket assembly further includes a cathode electrode attached to a first side of the transitional proton-conductive material;
- wherein the proton exchange membrane is attached to a second side of the transitional proton-conductive material; and
- wherein the fuel-cell membrane-subgasket assembly further includes an anode electrode attached to the proton exchange membrane.

19. A method to create a fuel-cell subgasket active area edge with through-plane proton conduction, the method comprising:
- attaching a first portion of a transitional proton-conductive material to an inner perimeter of a first picture frame-shaped subgasket and an inner perimeter of a second picture frame-shaped subgasket; and
- attaching a second portion of the transitional proton-conductive material to an outer perimeter of a proton exchange membrane and an outer perimeter of a first electrode layer, wherein the proton exchange membrane is connected to a second electrode layer, wherein the first picture frame-shaped subgasket, the second picture frame-shaped subgasket, the transitional proton-conductive material, the proton exchange membrane, the first electrode, and the second electrode together define a fuel-cell membrane-subgasket assembly.

20. The method of claim 19, wherein the fuel-cell membrane-subgasket assembly is a first fuel-cell membrane-subgasket assembly; and further comprising:
- assembling the first fuel-cell membrane-subgasket assembly to a second fuel-cell membrane-subgasket assembly to form a fuel-cell stack; and
- utilizing the fuel-cell stack to provide a useful flow of electrical energy.

* * * * *